July 11, 1939.  P. F. DONAHUE ET AL  2,165,621
PIPE CONNECTION
Filed May 20, 1938
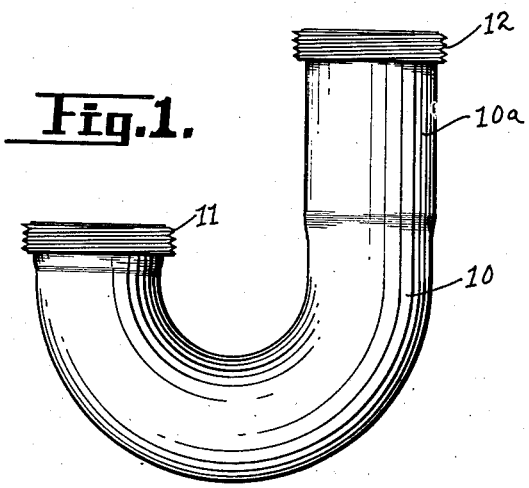
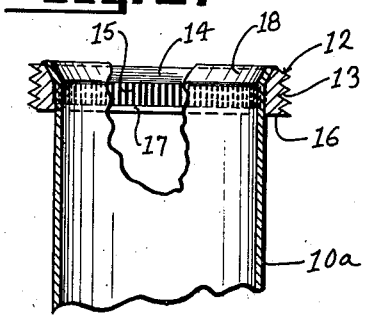
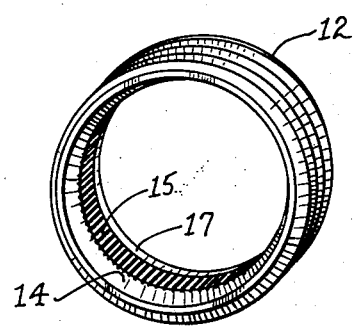
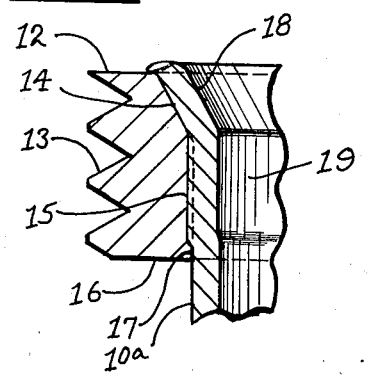
William P. Ferguson
Patrick F. Donahue
INVENTORS
BY
H. F. Johnston
ATTORNEY Patented July 11, 1939

2,165,621

UNITED STATES PATENT OFFICE 2,165,621

PIPE CONNECTION

Patrick F. Donahue, Waterville, and William P. Ferguson, Middlebury, Conn., assignors to Scovill Manufacturing Company, Waterbury, Conn., a corporation of Connecticut Application May 20, 1938, Serial No. 209,096

1 Claim. (Cl. 285—56)

This invention relates to pipe connections and particularly to the end construction of a tubular pipe such as employed in trap joint installations.

In the industry of manufacturing traps or other articles used in the plumbing trade the tubing used is of relatively thin walls, necessitating the attaching to the end of the tubing of a bushing member having sufficient stock to carry a relatively heavy thread by which means a union may be made with an adjacent connecting pipe. Heretofore, such bushings have been slipped over the end of the tubular pipe and held in place by a soldering operation. Experience has taught in the trade that this construction has not been entirely satisfactory because a soldering connection did not have the strength to hold under the excessive strains to which the bushings were subjected in making the connections, such soldering bushings breaking away from tubing, thereby rendering the member useless and requiring it to be discarded.

It is, therefore, one of the objects of this invention to attach a bushing to the end of a tubular pipe without the use of a solder in such a manner that there will be no twisting or axial movement of the bushing relative to the tubular end after it is first assembled in place. To attain the above object the bushing is provided on its interior with a beveled seat and a knurled portion, so that when it is assembled over the end of a tubular pipe and the end of said pipe is expanded outwardly with a suitable tool, the end of the tube is flared against the beveled seat of the bushing and the adjacent portion of the pipe is expanded sufficiently to cause the metal of the tubing to be forced into the interstices of the knurled section.

A further object is to provide a joint of the above nature in which consideration is given to making a connection between the parts to eliminate any openings or catch pockets in which deleterious acids or other substances may enter during the finishing operation.

The nature of this invention, along with other objects and various advantages thereof, will be more apparent from a consideration of the following description in connection with the accompanying drawing, in which Fig. 1 is a side elevation of a conventional J bend, such as used in trap installations, having the end bushings attached thereto in a manner embodying this invention.

Fig. 2 is a sectional view of one end of the J bend.

Fig. 3 is a perspective view of the threaded bushing, per se.

Fig. 4 is a fragmentary sectional view of one portion of the end joint considerably enlarged to more intimately show the details of construction.

Referring now to the drawing wherein like numerals refer to like parts throughout the several views, the numeral 10 refers to a tubular pipe bent in the form of a J and serving as one of the units in making a trap installation in plumbing connections. The opposite ends of the J pipe are fitted with threaded bushings 11 and 12 by means of which union may be made with the adjacent pipe structure in the manner well known in the trade. The fact that both bushings 11 and 12 are the same and are attached to the end of the pipe in like manner leaves it sufficient here to disclose but one of the bushings, wherein it is elected to describe in detail bushing 12 attached to the straight tubular portion 10a of the J pipe 10.

As best shown in Figs. 2 and 4, the metal thickness of the J pipe 10 is relatively thin as compared to the thickness of the bushing 12, it being necessary to have a relatively heavy bushing in order to provide a thread 13 of sufficient depth to permit connections to other pipes by union nuts, not shown. The interior wall of the bushing is formed at its upper end with a beveled surface 14, and the intermediate cylindrical wall of the bushing is formed with knurled section 15, preferably of the straight line type and relatively deep. The knurl in this case is preferably of the straight line type, disposed so as to merge into the adjacent portion of the beveled seat 14 but terminating short of the lower face 16 of bushing 12. By this construction a relatively narrow smooth cylindrical surface 17 is provided on the interior wall of the bushing adjacent the lower face 16, which surface is adapted to embrace snugly the exterior wall of the tubular section 10a.

In the construction of the J bend the bushing 12 formed in the above manner is first slipped over the end of the pipe section 10, it being understood that initially the end of the pipe section 10 is in tubular form throughout its entire length. When the bushing 12 is properly located relative to the pipe section 10a, a suitable tool, not shown, is axially inserted into the interior of the pipe section 10a flaring the end thereof, as indicated at 18, outwardly against the beveled seat 14 of the bushing 12. A ring portion 19 of the pipe section 10a adjacent the flared portion 18 is also subjected to an expanding force from the same tool sufficient to cause that portion of the pipe section 10a to be swelled outwardly and fill into knurled section 15 of the bushing 12, and thus to lock the pipe and bushing against rotation relative to each other.

In making trap joint connections and using a J bend of the type shown, it is known that the strain upon the bushing 12 tends to pull the bushing off from the pipe end. The fact that in this construction the end of the pipe is flared on a bevel which meets a complementary beveled seat on the connecting pipe (not shown) produces a result whereby the greater the force exerted upon the coupling nut in making the connection, the greater will be the gripping effect upon the flared wall 18 between the beveled surface 14 and the complementary bevel of the connecting pipe. The knurled section 15, as stated above, locks the bushing 12 sufficiently against rotation on the pipe end 10a as to overcome any twisting force exerted upon the bushing by the turning of the coupling nut.

In swelling the ring portion 19 of the pipe section 10a, from practical experience it is known that it will be impossible to expand the metal of the tubing to so full a depth of the grooves in the knurled section 15 as to render that connection leak proof. Therefore, to seal the above joint, the unknurled smooth surface 17 is adapted to embrace the outer wall of the section 10a in a leak-proof manner. At the upper end of the knurled section 15 another leak-proof seal is effected between the adjacent walls of the flared portion 18 and the beveled seat 14 so that, in case any openings remained where the grooves of the knurled section 15 meet the expanded wall portion 19 of the tubing 10, there will be effective prevention of any acids or other deleterious substances from entering into said openings during the finishing operation. Such a construction is quite essential, because if acids were free to enter and be entrapped between the contiguous surface of the bushing 12 and pipe section 10a such acids would subsequently impair the strength of the union between the parts and also deface the finish of the J bend.

While there has been shown in this embodiment a straight knurled section to prevent relative rotation of one member to the other, it is to be understood that there are various other expedients besides a straight knurl that might be employed for preventing relative rotation, the desired effect being to expand that portion of the tubing 10 outwardly into an intermediate portion of the bushing 12 in a manner to lock the parts against rotation and preclude any catch pockets for liquids and preferably designed to permit a tool to be inserted axially into the tubing to effect the desired expansion thereof in making the assembly.

While there is herein described and upon this drawing shown an illustrated embodiment of the invention, it is to be understood that the invention is not limited thereto but may comprehend other constructions, arrangements, and details of parts without departing from the spirit of the invention.

What is claimed:

A joint connection for the end of a tubular pipe of relatively thin wall thickness; an exteriorly threaded ring bushing designed to slip over the end of said pipe and the interior wall surface which is formed with a bevelled face at one end, an intermediate knurled section and a smooth cylindrical surface at the opposite end, said ring bushing securely attached to said pipe by having the end portion of the pipe flared outwardly against said bevelled face to prevent axial removal, the adjacent portion of the pipe expanded to extrude a portion of the wall surface into said knurled section to prevent relative rotation and still a third portion of the pipe expanded to tightly engage against the cylindrical surface and provide a liquid proof seal therebetween, the expanding portions of the tube all being simultaneously effected by a tool driven axially into the end of said pipe.

WILLIAM P. FERGUSON.
PATRICK F. DONAHUE.